United States Patent [19]
Altemus, Jr. et al.

[11] Patent Number: 5,826,703
[45] Date of Patent: Oct. 27, 1998

[54] MOTIONLESS CONVEYOR BELT IDLER SYSTEM

[75] Inventors: William H. Altemus, Jr., Gloucester; Ray V. Rodgers, III, Urbanna, both of Va.

[73] Assignee: B.R. Products, LLC, Gloucester, Va.

[21] Appl. No.: 739,880

[22] Filed: Oct. 31, 1996

[51] Int. Cl.[6] ................................................. B65G 15/08
[52] U.S. Cl. .......................................... 198/823; 198/841
[58] Field of Search .................................... 198/818, 820, 198/823, 841, 840

[56] References Cited

U.S. PATENT DOCUMENTS

| | | | |
|---|---|---|---|
| 3,711,090 | 1/1973 | Fiedler | 272/69 |
| 4,008,801 | 2/1977 | Reilly et al. | 198/841 |
| 4,215,776 | 8/1980 | Esler | 198/823 |
| 4,359,156 | 11/1982 | Austin | 198/841 |
| 4,576,277 | 3/1986 | Park et al. | 198/803.01 |
| 4,793,470 | 12/1988 | Andersson | 198/823 |
| 4,927,007 | 5/1990 | Kramer | 198/823 |
| 4,932,516 | 6/1990 | Andersson | 198/823 |
| 5,007,528 | 4/1991 | Hideharv | 198/823 |
| 5,038,924 | 8/1991 | Stoll | 198/823 |
| 5,074,407 | 12/1991 | Brumby | 198/841 |
| 5,088,966 | 2/1992 | Suzuki et al. | 474/111 |
| 5,350,053 | 9/1994 | Archer | 195/525 |
| 5,353,920 | 10/1994 | Szalankiewicz et al. | 198/823 |

Primary Examiner—James R. Bidwell
Attorney, Agent, or Firm—Moore, Foard & Dias; Richard M. Foard

[57] ABSTRACT

A motionless conveyor belt idler system for replacing conventional conveyor rotating belt idler systems consisting of a plurality of fixed, straight, low friction belt support bars of equal length, made of ultra high molecular weight polyethylene, for slideably supporting the product side and the return side of a conveyor belt. All fixed, straight, low friction belt support bars are slideably mounted on the idler system frame to permit easier replacement even when the conveyor belt is loaded with product. All of said belt support bars are identically configured to be interchangeable with one another. Additionally the conveyor belt idler system may be provided with fixed, straight low friction conveyor belt product side and return side edge guides which are also constructed of ultra high molecular weight polyethylene, and which are identically configured with the fixed, belt support idlers in all dimensions except length. The fixed edge guides are also slideably mounted on the idler system framework so as to permit easier replacement of worn or damaged parts.

15 Claims, 7 Drawing Sheets

MOTIONLESS CONVEYOR BELT IDLER SYSTEM

BACKGROUND OF THE INVENTION

The present invention relates generally to a non-rotating, or motionless, conveyor belt idler system for replacing existing, rotating conveyor belt idlers. Conveyor belts are used in varying industrial applications for carrying products from one point to another. Typically conveyor belts are comprised of an endless belt which carries the product to its destination on the upwardly disposed, top portion of the belt. Once the end of the conveyor belt machine is reached, the product is typically dumped, or off loaded, onto a platform or another conveyor belt, and then the continuous belt returns along the bottom section of the conveyor belt machine. The outward bound, or product side, of the conveyor belt may be either flat, in case of readily contained or packaged products, or may be formed into a trough to better contain bulk products such as stone, wood chips or agricultural products. Conveyor belts are typically supported on both their outbound and return runs by a series of cylindrical idlers rotatably mounted on axles which are disposed generally perpendicularly to the direction of belt travel. In the case of a troughed belt, the upper idlers supporting the outward bound, or product side, of the conveyor belt are typically formed in three or more segments in order to elevate the edges of the belt so as to form a trough and better contain the product being conveyed. The return portion of the conveyor belt is typically supported by a single rotating cylindrical idler extending the full width of the conveyor belt, such that the return portion of the belt is flat across its entire width.

One major problem with a conveyor belt machine utilizing rotating belt supporting idlers is the need for regular maintenance. Typically rotating idlers require periodic greasing and replacement as bearings wear out or seize. Additionally, rotating idlers and their axles or mounting devices fail structurally and fall off of the machine, thereby endangering personnel and other machinery. Furthermore, maintenance of conventional conveyor belt idler systems generally requires that the machine be shut down for regular and extended periods of time in order to accomplish lubrication and other needed maintenance. It is often necessary to jack up or otherwise support the product side of a conveyor belt in order to replace worn conventional idlers.

Additionally, conveyor belts must often operate in extremely harsh environments, such as in areas where the atmosphere is laden with abrasive dust and in chemically corrosive environments. In such environments conventional rotating idlers and their bearings and axles must be either made of more expensive materials or otherwise shielded from the environment, thus increasing their expense and further making regular maintenance more critical and more difficult. It is also desirable that a conveyor belt idler system result in as little friction as is possible in its contact with the conveyor belt in order to minimize overall conveyor belt machine power requirements.

As can be seen from the above discussion, it is therefore desirable that a conveyor belt idler system adequately support and form the conveyor belt in order that the belt may carry the desired product. It is further desirable that the idler system require a minimum of maintenance and machine down time to accomplish maintenance. It is further desirable that any improved conveyor belt idler system be adaptable to the thousands of conveyor belt machines currently in use throughout industry and that any idler system minimize the likelihood of parts falling off of a conveyor belt machine should they fail. Accordingly, for these and other reasons the need exists for a low maintenance, low friction and inexpensive conveyor belt idler system which is adaptable to existing conveyor belt machines.

Prior art devices teach many designs and configurations of conveyor belt supporting systems, including rotating idlers in various configurations and fixed, low friction supports in many configurations. However, none of the prior art teaches a fixed, low cost, low friction conveyor belt idler system readily adaptable to existing machines as is found in the present invention.

SUMMARY OF THE INVENTION

It is therefore an object of the present invention to develop a low cost, low-friction, low maintenance, conveyor belt idler system for replacing existing rotating idlers.

It is another object of the present invention to provide a conveyor belt idler system requiring less maintenance than conventional systems.

It is yet another object of the present invention to provide a conveyor belt idler system which, if necessary, can be maintained without requiring machine shut down.

Yet still another object of the present invention is to provide a conveyor belt idler system capable of operating with a minimum of maintenance in abrasive or corrosive conditions.

It is yet still another object of the present invention to provide a conveyor belt idler system in which individual portions of the system may be replaced as they wear without requiring replacement of portions of the system which are not worn out.

It is yet still another object of the present invention to provide a conveyor belt idler system wherein partially worn components may be easily modified and used in other areas of the system, thus minimizing expense and waste from worn parts.

According to one embodiment of the present invention, the foregoing and other objects are obtained by providing a motionless conveyor belt idler system for both the product and return side of an existing conveyor belt machine which is capable of being mounted on an existing conveyor belt machine by means of the same mounting points used by the conventional rotating idler system. The motionless idler system is provided with a plurality of plastic polymer belt support bars having either a flat or semi-circular upper surface for supporting both the product side and return side of the conveyor belt. Said polymer bars are constructed from a low friction material such as very high density (ultra high molecular weight) polyethylene and are arranged in the same general configuration as the rotating idlers which they replace. Said polymer bars are further slideably mounted on a supporting framework such that they may be easily replaced by removing end caps which hold them in place, sliding out the worn bar and replacing it with a new one.

DESCRIPTION OF THE PREFERRED EMBODIMENT

Figure 1:
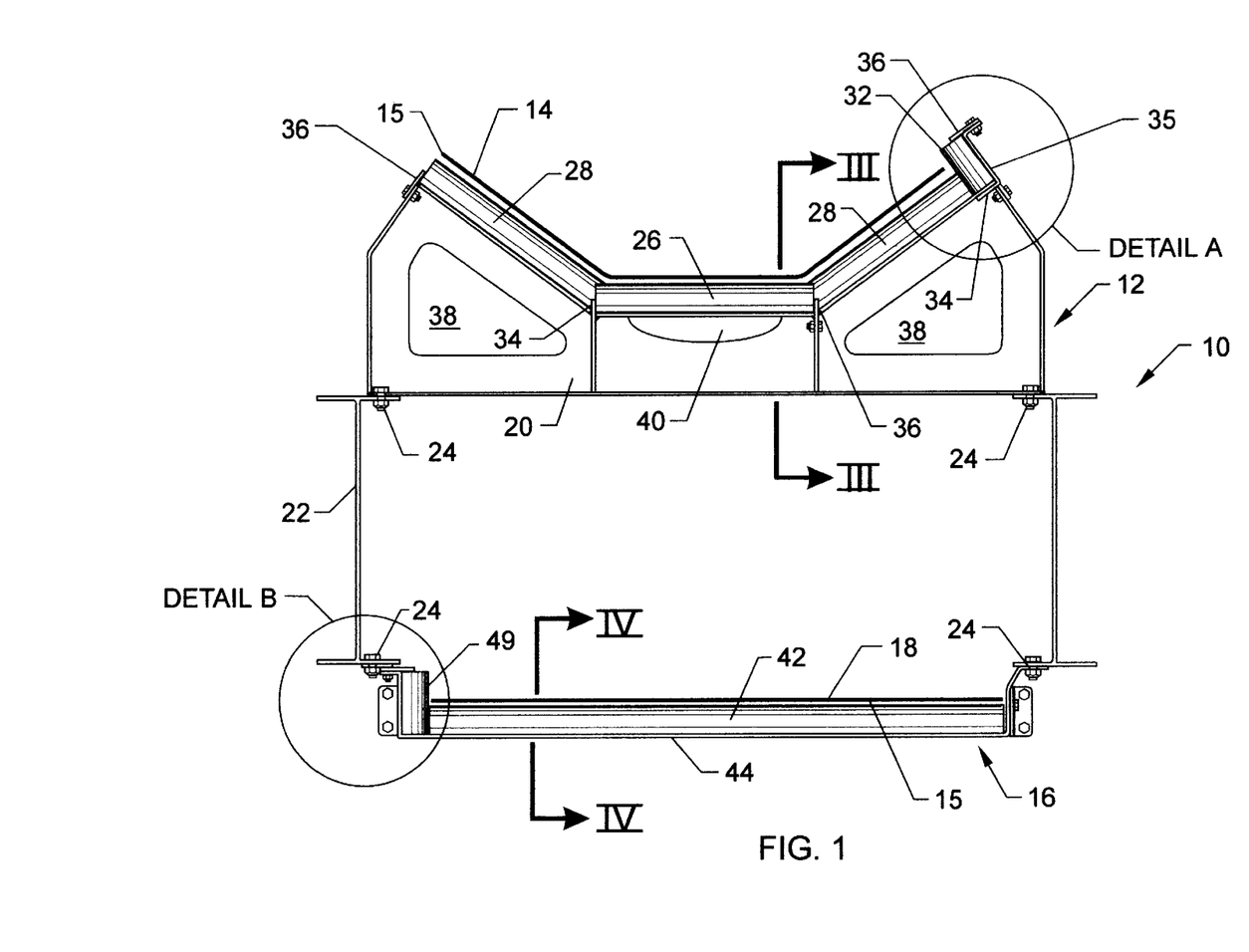
FIG. 1. is an elevation view of a device constructed according to the present invention shown in a cross-sectional view of a conveyor belt machine.
Figure 2:
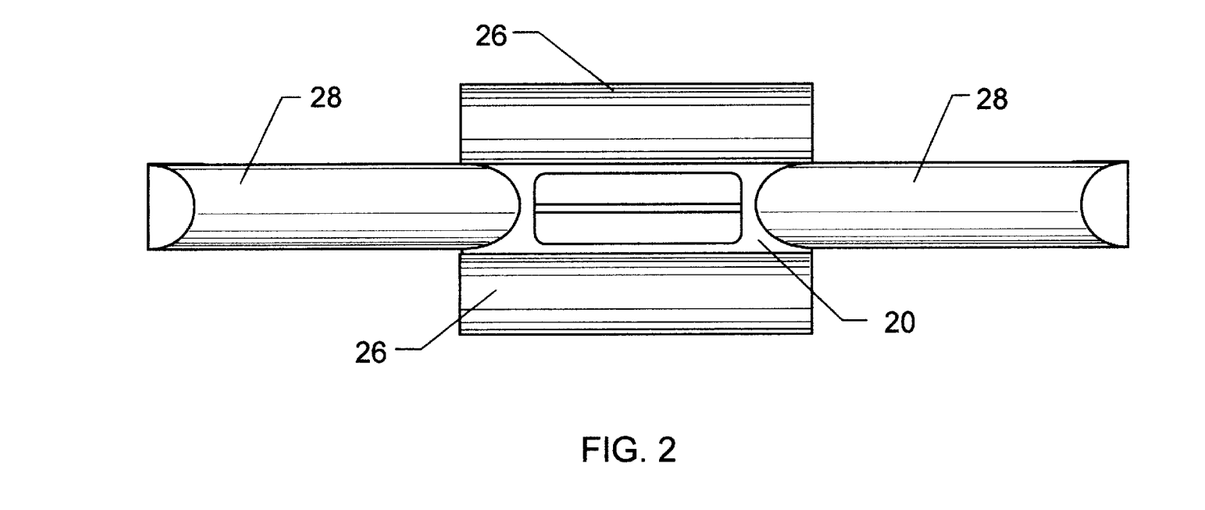
FIG. 2. is a partial top view of a portion of a device constructed according to the present invention.
Figure 3:
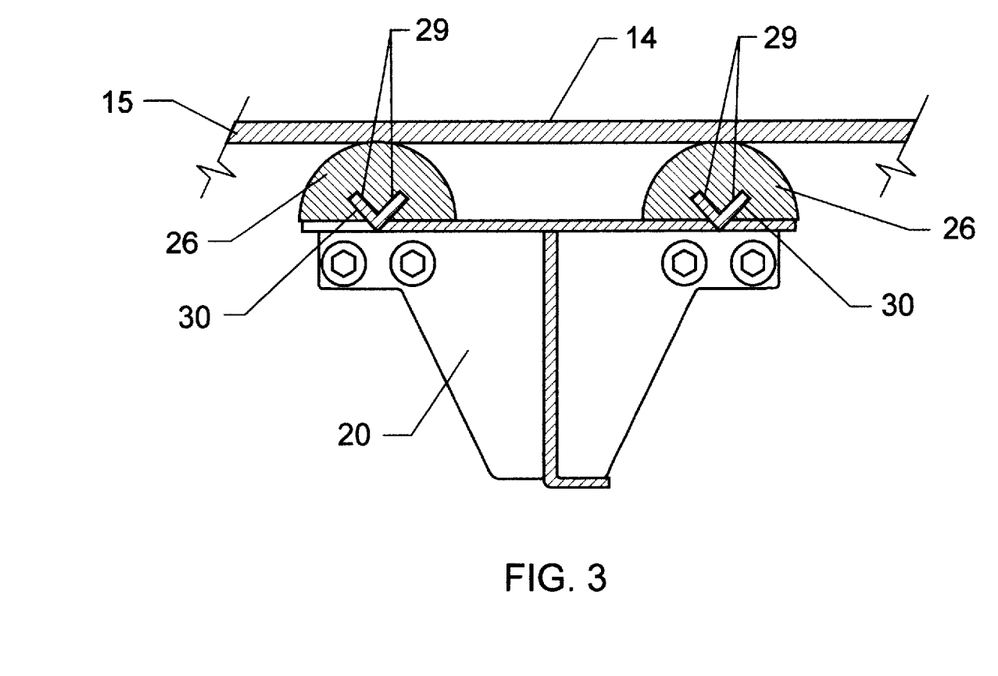
FIG. 3. is a cross-sectional view along line III—III of FIG. 1.

Referring now to the drawings wherein like reference characters designate identical or corresponding parts, and more particularly to FIG. 1, there is shown an elevation view of the present invention, designated generally by the reference numeral 10, which is comprised basically of an upper motionless conveyor belt idler system, designated generally by the reference numeral 12, for supporting and forming the upper or product side 14 of the conveyor belt 15 and a lower motionless conveyor belt idler system, designated generally by the reference numeral 16, which serves to support and guide the return portion 18 of conveyor belt 15. The product side idler system is comprised of a support frame 20 which is bolted to the conveyor belt machine main framework 22 by means of a plurality of cap screws 24 or other suitable means. It should be noted that frame 20 is configured to be a direct replacement for an existing rotating idler support framework, such that the present invention may be easily and readily substituted on an existing machine for the previous conventional idler system. As shown in FIGS. 2 & 3, a plurality of center and edge motionless idlers 26 and 28, respectively, are slideably mounted on upper frame 20 by means of shaped grooves 29 milled in the bottom of idlers 26 for purposes of receiving retaining brackets 30 which are an integral part of frame 20. Edge idlers 28 are slideably mounted to frame 20 in an identical fashion. In a typical application, center idlers 26 and edge idlers 28 are the same length in order to promote interchangeability of replacement parts.

It should be noted that idlers 26 and 28 are disposed with their longitudinal axis perpendicular to the direction of belt travel, angularly disposed to one another along their longitudinal axes, and are approximately the same size as the rotating idlers which they are designed to replace in order to support the conveyor belt in the fashion for which it is designed. The system for mounting the idlers, consisting of grooves 29 and bracket 30, provides for slideable, or slip, fit between frame 20 and idlers 26 and 28 so as to allow for easy replacement of worn idlers and to provide for thermal expansion and contraction of the idler bar relative to support frame 20. Furthermore, as may be seen from FIGS. 1 & 2, center idlers 26 support the center portion of the product side of the conveyor belt and preferably consist of dual idlers as the center section of the product side of the conveyor belt is subject to greater loadings. Edge idlers 28 serve to form the product side 14 of conveyor belt 15 into a trough in order to better contain unpackaged product within the conveyor belt.

Figure 5A:
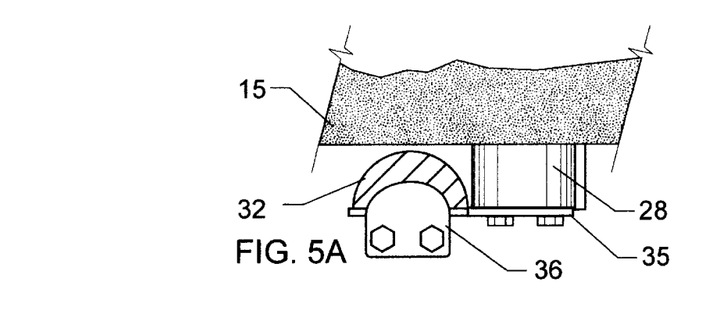
FIGS. 5A., 5B and 5C. are orthogonal views in three dimensions of DETAIL A of FIG. 1.
Figure 5B:
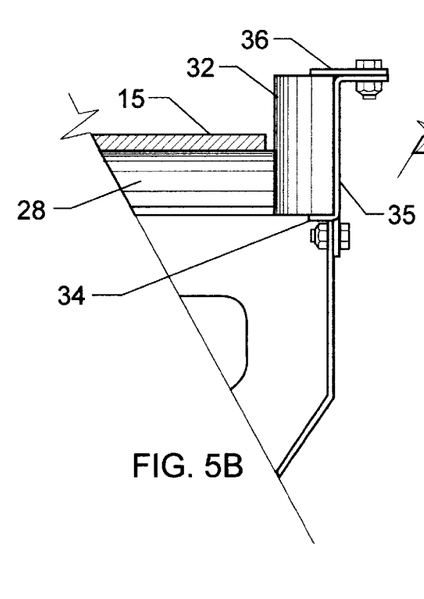
Figure 5C:
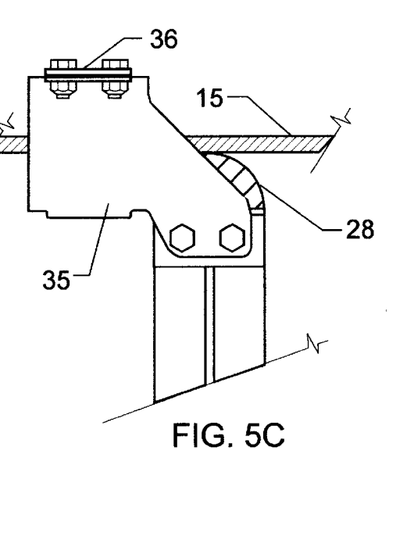
Figure 6A:
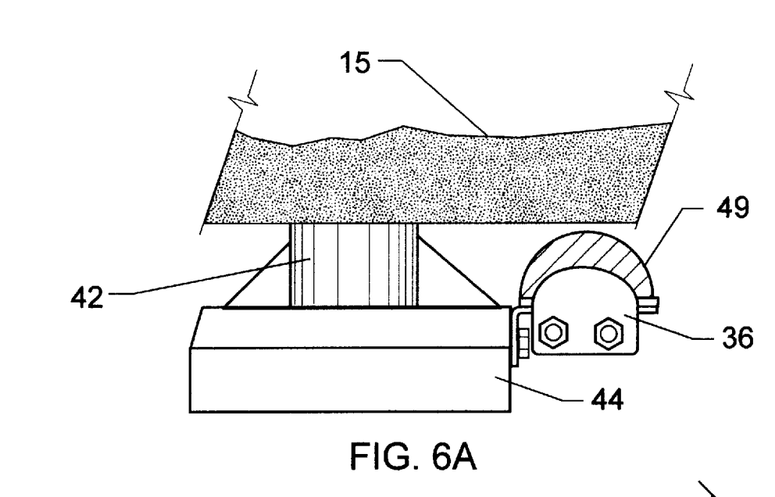
FIGS. 6A., 6B. and 6C. are orthogonal views in three dimensions of DETAIL B of FIG. 1.
Figure 6B:
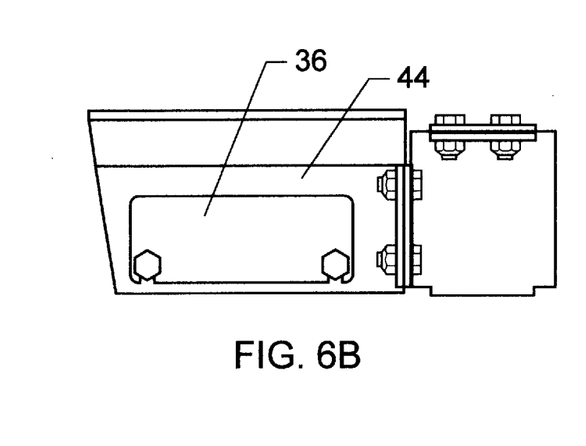
Figure 6C:
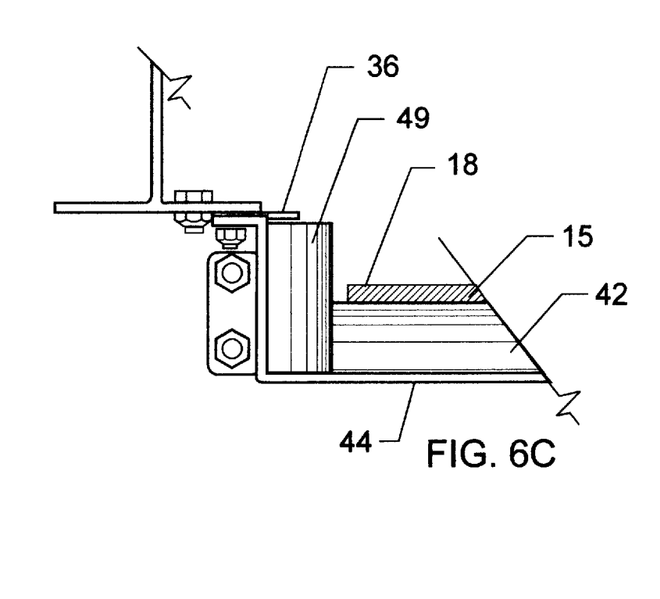

It should also be noted that the product side 14 of belt 15 may be fitted with edge guides 32 for purposes of keeping conveyor belt 15 centered with respect to the conveyor belt machine. If it is desired to use edge guides in any given application, they should be fitted to both edges of the conveyor belt idler system. For illustration purposes, FIG. 1 shows edge guides 32 along one edge only of the product and return sides of conveyor belt 15. Referring also to FIGS. 5A, 5B and 5C, edge guides 32 are mounted with a groove and bracket system similar to idlers 26 and 28, and idlers 32 are held in place longitudally by means of bosses 34 and removable end plates 36. Changing idlers 26 and 28 or edge guides 32 is accomplished by loosening the fastening means securing removable end plates 36, rotating or removing end plates 36 and then sliding the old edge guide or idler out of its bracket longitudinally and replacing it with a new edge guide or idler.

In those instances where edge guides 32 are utilized, as seen in FIGS. 5A, 5B and 5C, frame 35 of edge guide 32 serves the same function as removable end plate 36 in order to retain idlers 28. It should be noted that each frame 20 is in the preferred embodiment provided with two central idlers 26 to support the increased load in the center of the product side of the conveyor belt. Frame 20 may be constructed of steel or any workable alternative material such as reinforced plastic, more noble metals or the like as may be required by the conveyor belt operating environment. Frame 20 is also provided with lightening holes 38 and 40. Holes 40 also serve to provide access to the area between central rollers 26 in order to remove accumulated debris.

Edge guides 32 and product side idlers 26 and 28 are preferably constructed of a plastic polymer such as polyethylene, nylon, polytetrafluoroethylene (Teflon®), or acetal resin (Delrin®). It should be noted that other materials yielding low friction between conveyor belt 15 and the idler may also be used. The preferred idler material for device constructed according to the subject convention is very high density polyethylene (also known as ultra high molecular weight polyethylene or UHMW polyethylene) which yields an excellent compromise between durability, cost and low friction.

Figure 4:
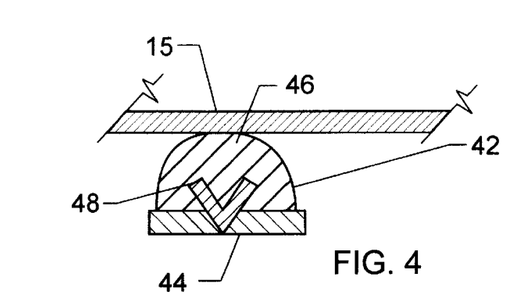
FIG. 4. is a cross-sectional view along line IV—IV of FIG. 1.

Referring now once again to FIG. 1, the present invention also contemplates the use of the motionless idler system constructed according to its teachings for purposes of supporting and guiding the return side 18 of conveyor belt 15. As in the case of the idler system for the upper, product side 14 of the conveyor belt 15, return side system 16 is configured so as to employ the same mounting holes and methods for attachment to conveyor framework 22 as the existing rotating idler system in order that it may be utilized as a direct replacement for existing rotating return side idlers. Frame 44 of return idler system 16 is secured to conveyor frame 22 by means of cap screws 24 or other suitable means. Referring now to FIG. 4, return idler 42 is mounted upon return idler frame 44 by means of grooves 46 cut into the underside of idler 42 which slidely engage bracket 48 which is fixedly mounted to frame 44.

It should be noted that return idler system 16 may also be fitted with edge guides 49 in a manner similar to that employed for the upper, product side idler system as shown in FIGS. 1 and 6A, 6B and 6C. If edge guides 49 are to be employed, it is desirable to employ them at both ends of each return idler system 16. For illustration purposes only, however, edge guide 49 is shown at only one end of return idler 16 in FIG. 1.

Figure 9A:
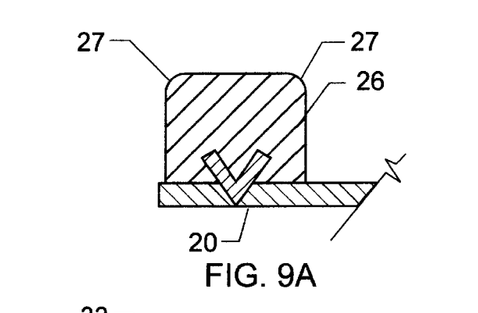
FIG. 9. is a partial cross sectional views of two alternate embodiments of the present invention along line III—III of FIG. 1.
Figure 9B:
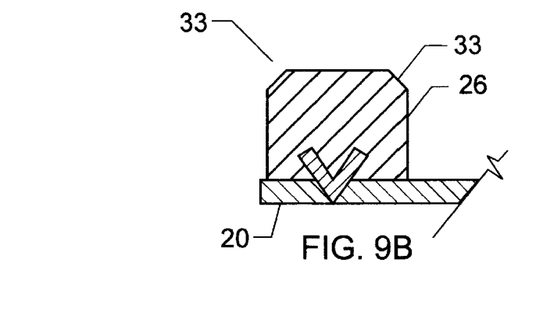

As is shown in FIG. 4, one preferred shape for return idler 42, as well as for product side idlers 26 and 28 and edge guides 32 and 49 is semi-circular in cross-section. Referring now to FIGS. 9A and 9B, there are shown alternate cross-sectional configurations of idlers 26, 29 and 42, as well as edge guides 32 and 49 (collectively referred to in FIGS. 9A and 9B by the reference number 26) employing either a rectangular cross-section having quarter round edges 27 or a rectangular cross-sectional configuration employing chamfered edges 33. It should be noted that the various cross-sectional configurations taught in the present invention may be interchanged in order to achieve the desired compromise between load bearing capacity, wear and low friction.

Figure 10:
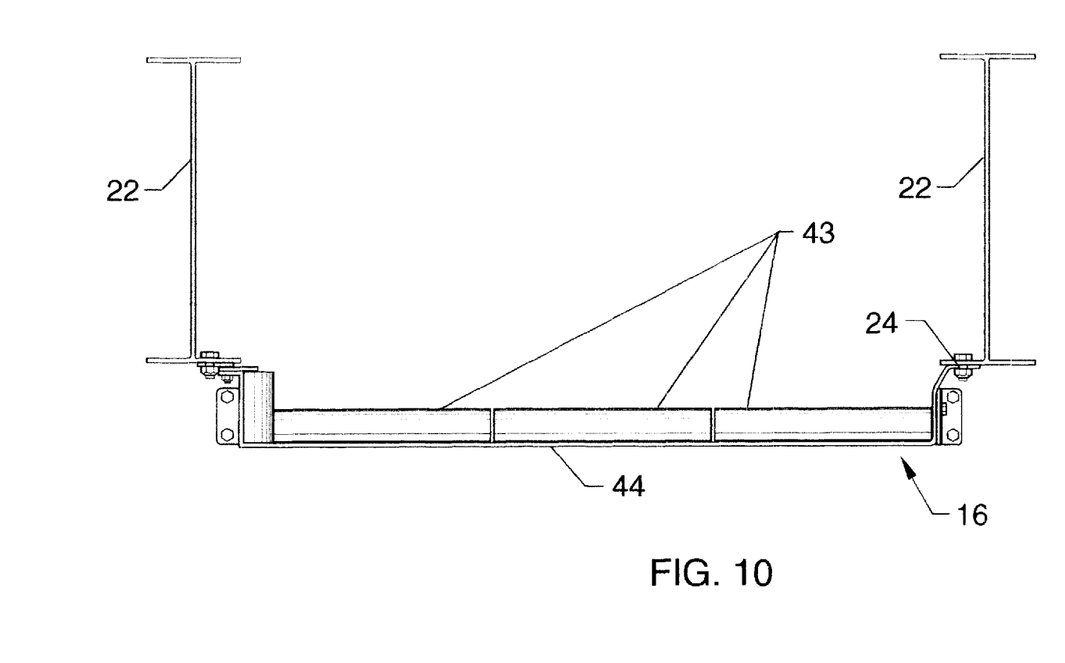
FIG. 10. is an elevation view of an alternate embodiment of a portion of a device constructed according to the present invention.

FIG. 10 shows an alternate embodiment of return idler system 16 in which the return motionless idler is composed of three equal length polymer segments 43. Each return idler segment 43 is the same size in all dimensions as center idlers 26 and edge idlers 28, thus enabling a replacement part to be used interchangeably as a center idler 26, edge idler 28 or return idler segment 43.

Figure 7:
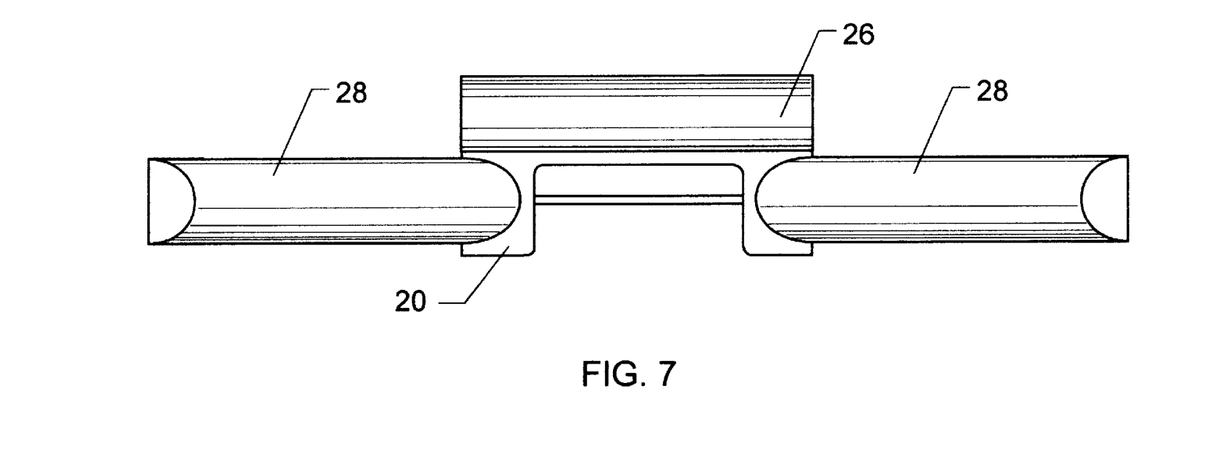
FIG. 7. is a partial top view of an alternate embodiment of the present invention.

Referring now to FIG. 7, there is shown yet still another alternate embodiment of the present invention. FIG. 7 is a schematic top view of the upper, product side idler system constructed according to the present invention in which only a single central idler 26 is utilized. Such a single central idler system might be utilized in those applications where product loads were minimal and double central idlers were not necessary to support the load carried.

Figure 8:
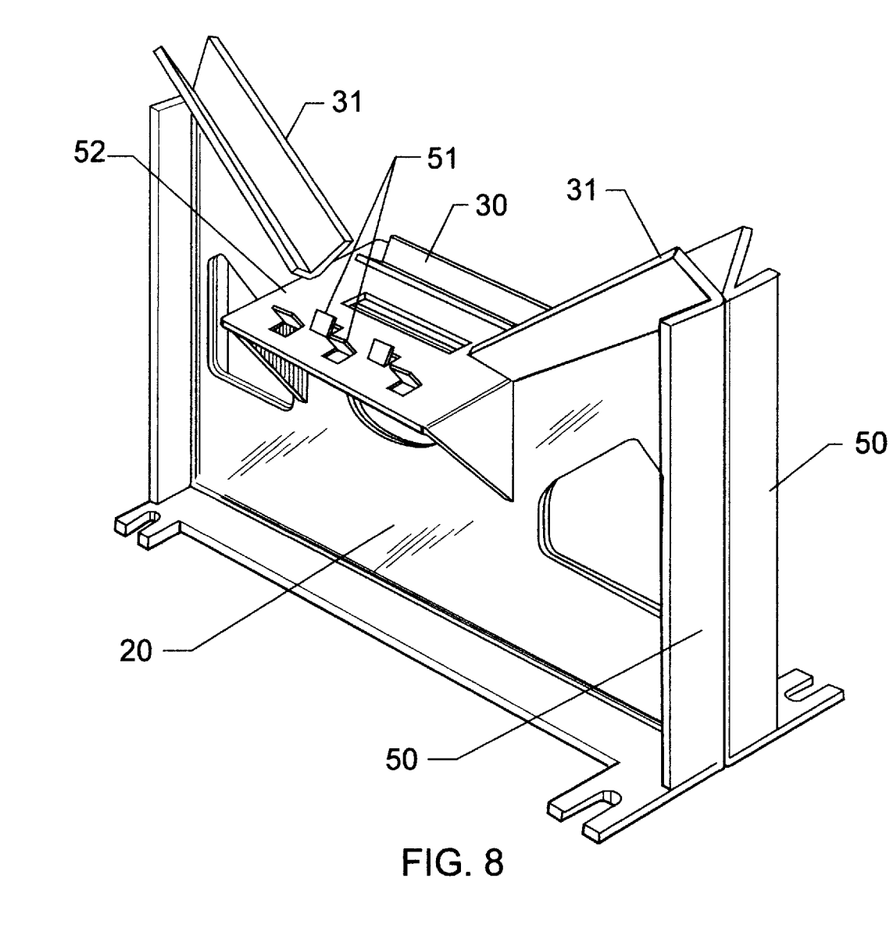
FIG. 8. is a perspective view of an alternate embodiment of the support frame for the product side of a motionless idler system constructed according to the present invention.

Referring now to FIG. 8, there is shown a perspective view of yet another alternate embodiment of the present invention wherein bracket 20 is comprised of three pieces which may be fabricated of sheet steel or other workable material. In the embodiment shown in FIG. 8, upper, product side bracket 20 is comprised of two identical halves 50 which are welded together at the edges, and when so affixed together, serve to form idler mounting brackets 31. In the embodiment shown in FIG. 8, the mounting brackets 30 for central idlers 26 are formed by welding angle iron or other suitable material to central platform 52. Central platform 52 is formed of sheet steel or other suitable material, provided with slots and bent where needed in order to straddle idler mount halves 50. Central idler platform 52 may be affixed to bracket stand halves 50 by means of welding or other workable alternative. As is also shown in FIG. 8, a workable alternative to bracket 30 may be formed by punching out multiple tabs 51 from central idler platform 52 and bending them upward to engage the milled grooves 29 in center idler 26.

In operation, the present invention would be substituted for both the upper product side idler system and the lower return idler system affixed to a conventional commercial conveyor belt machine. Since all idlers and edge guides on the present invention are straight, they may be slideably mounted on their respective frames and may be easily changed by removing end plates 35 and 36, sliding the old worn idler out and replacing the same with a new idler or edge guide. It is preferable that all V groove mounting systems be identically configured so that materials may be saved by cutting out the less worn portions of longer idlers for use in those applications requiring a shorter idler such as upper, product side idlers or edge guides.

An idler system constructed according to the present invention has many advantages over existing idler systems, as follows: 1) The straight idler bars provide for easy repair and replacement and may all be manufactured identically and then trimmed to the appropriate length. 2) Furthermore, the slidable mounting taught by the present invention allows for thermal expansion to be accommodated in a uniform manner without resulting in buckling of the idlers or uneven load bearing of the conveyor belt by a given idler. 3) The present invention may be constructed far more cheaply than existing conventional idlers, and because the idlers do not rotate, they do not require conventional bearing lubrication, replacement or shielding. 4) Materials utilized in the preferred embodiment of the present invention are highly inert and are not subject to excessive wear in a dirty environment. 5) Additionally, motionless idlers constructed of the preferred UHMW polyethylene exhibit low friction characteristics which compare well with rotating idler systems. 6) A device constructed according to the present invention enables an operator to change idlers without having to unload the product side of the conveyor belt or to support the belt by jacks during the changing of idlers. 7) Although it should be discouraged for safety reasons, it is also possible to change idlers on the present invention without stopping the conveyor belt. 8) Due to the low friction inherent in a device constructed according to the present invention, it is suitable for use on long conveyor belt runs where hundreds of idler systems may be required. 9) A device constructed according to the present invention provides for uniform support of the conveyor belt surface along the entire length of each idler, resulting in lower specific pressure on the belt and in an idler system which in turn yields slower wear rates. Additionally, since the center idlers which support the upper, product side of the belt are subject to greater loadings than the idlers supporting the outer edge of the belt product side, they tend to wear more quickly. In the present invention these center idlers can be changed as they wear without the time and expense required to change those idlers supporting the outer edges of the belt.

The present invention teaches the use of many materials from which idlers may be constructed. In practice it has been found that ultra high molecular weight (UHMW) polyethylene yields the best compromise between low friction, wear and cost, and accordingly, it is the material of choice in the preferred embodiment. In summary, a conveyor belt idler system constructed according to present invention is far cheaper to manufacture and operate and may be employed as a superior substitute in existing machines for conventional idler systems, resulting in better performance, reduced costs and greater safety.

It should be noted that the present invention can be practiced with many variations of materials including the use of metals, plastics or other materials in the construction of its various components. Obviously numerous additional modifications of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A motionless conveyor belt idler system for replacing conventional idler systems having a plurality of fixed belt support stations each of which comprises:

a plurality of fixed, straight ultra-high molecluar weight polyethylene bars for slidably supporting the center section of the product side of a conveyor belt, being rectangular in cross section with chamfered edges, and disposed perpendicularly to the direction of belt travel and further detachably mounted on the support bracket for said idler system by means of a lengthwise female slot in the underside thereof in slidable engagement with a corresponding bracket affixed to said support bracket for said idler system;

a plurality of fixed straight ultra-high molecular weight polyethylene bars for slidably supporting and forming both outer sections of the product side of a conveyor belt into a trough, being rectangular in cross section with chamfered edges and disposed perpendicularly to the direction of belt travel and further detachably mounted on the support bracket for said idler system by means of a lengthwise female slot in the underside thereof in slidable engagement with a corresponding bracket affixed to said support bracket for said idler system;

a plurality of fixed, straight ultra-high molecular weight polyethylene bars for slidably supporting the return side of a conveyor belt, being rectangular in cross section with chamfered edges, and disposed perpendicularly to the direction of belt travel and further detachably mounted in end-to-end linear alinement on the support bracket for said idler system by means of lengthwise female slots in the undersides thereof in slidable engagement with a corresponding bracket affixed to said support bracket for said idler system;

and plurality of fixed, straight ultra-high molecular weight polyethylene edge guide bars at each support station for slidably maintaining the travel of a conveyor belt product side and return side in alinement with said fixed belt support stations, being rectangular in cross section with chamfered edges, and disposed perpendicularly to the direction of belt travel and further detachably mounted on the support bracket of said idler system by means of lengthwise female slots in the undersides thereof in slidable engagement with corresponding brackets affixed to said support bracket for said idler system;

and wherein the cross sectional configuration of all of said ultra-high molecular weight polyethylene bars is identical;

and wherein all of said ultra-high molecular weight polyethylene bars for supporting both the product side and return side of said conveyor belt are of identical dimensions with respect to one another so as to be interchangable.

2. A motionless conveyor belt idler system for replacing conventional idler systems having a plurality of fixed belt support stations each of which comprises:

fixed, straight low friction support means for slideably supporting the center section of the product side of a conveyor belt and disposed perpendicularly to the direction of belt travel;

fixed, straight low friction support means for slideably supporting and forming both outer sections of the product side of a conveyor belt into a trough and disposed perpendicularly to the direction of belt travel;

fixed, straight low friction support means for slideably supporting the return side of a conveyor belt and disposed perpendicularly to the direction of belt travel;

means for replacing said fixed, straight low friction support means while said conveyor belt remains loaded with product; and fixed, straight low friction edge guide means at each support station for slideably maintaining the travel of the conveyor belt product side and return side in alinement with said fixed belt support stations.

3. A motionless conveyor belt idler system for replacing conventional idler systems having a plurality of fixed belt support stations as in claim 2 wherein:

each of said fixed, straight low friction support means for supporting the center section of the product side of the conveyor belt comprises a plurality of fixed, straight low friction support means.

4. A motionless conveyor belt idler system for replacing conventional idler systems having a plurality of fixed belt support stations as in claim 2 wherein:

each of said fixed, straight low friction support means and edge guide means is constructed of plastic polymer.

5. A motionless conveyor belt idler system for replacing conventional idler systems having a plurality of fixed belt support stations as in claim 2 wherein:

each of said fixed, straight low friction support means and edge guides means is constructed of acetal resin.

6. A motionless conveyor belt idler system for replacing conventional idler systems having a plurality of fixed belt support stations as in claim 2 wherein:

each of said fixed, straight low friction support means and edge guides means is constructed of nylon.

7. A motionless conveyor belt idler system to replace conventional idler system having a plurality of fixed belt support stations as in claim 2 wherein:

each of said fixed, straight low friction support means and edge guides means is constructed of polytetrafluoroethelyne.

8. A motionless conveyor belt idler system for replacing conventional idler systems having a plurality of fixed belt support stations as in claim 2 wherein:

each of said fixed, straight low friction support means and edge guides means is constructed of polyethylene.

9. A motionless conveyor belt idler system for replacing conventional idler systems having a plurality of fixed belt support stations as in claim 2 wherein:

each of said fixed, straight low friction support means and edge guides means is constructed of ultra high molecular weight polyethylene.

10. A motionless conveyor belt idler system for replacing conventional idler systems having a plurality of fixed belt support stations as in claim 2 wherein:

each of said fixed, straight low friction support means and edge guide means are identical in cross sectional configuration.

11. A motionless conveyor belt idler system for replacing conventional idler systems having a plurality of fixed belt support stations as in claim 9 wherein:

the cross sectional configuration of that portion of each of said fixed, straight low friction support means and edge guide means disposed toward and in sliding contact with said conveyor belt is generally semi-circular.

12. A motionless conveyor belt idler system for replacing conventional idler systems having a plurality of fixed belt support stations as in claim 9 wherein:

the cross sectional configuration of that portion of each of said fixed, straight low friction support means and edge guide means disposed toward and in sliding contact with said conveyor belt is generally rectangular with edges rounded to the general configuration of a quarter circle.

13. A motionless conveyor belt idler system for replacing conventional idler systems having a plurality of fixed belt support stations as in claim 9 wherein:

the cross sectional configuration of that portion of each of said fixed, straight low friction support means and edge guide means disposed toward and in sliding contact with said conveyor belt is generally rectangular with chamfered edges.

14. A motionless conveyor belt idler system for replacing conventional idler systems having a plurality of fixed belt support stations as in claim 2 wherein:

said means for replacing said fixed, straight low friction support means comprises a detachable low friction fixed polymer idler bar in sliding contact with said conveyor belt having a lengthwise, female slot in the underside thereof in slideable engagement with a corresponding bracket affixed to the support bracket for said support means.

15. A motionless conveyor belt idler system for replacing conventional idler systems having a plurality of fixed belt support stations as in claim 13 wherein:

all of said fixed, low friction support means for slideably supporting the center and outside edges of the product side of the conveyor belt and for slideably supporting the return section of the conveyor belt, and said fixed, straight low friction edge guide means are composed of bars of ultra-high molecular weight polyethylene, are identical in cross sectional configuration and are disposed perpendicularly to the direction of conveyor belt travel and removeably mounted on rigid brackets which are affixed to the conveyor machine framework;

said straight low friction means for slidably supporting the return side of a conveyor belt is comprised of a plurality of bars of ultra-high molecular weight polyethylene, removeably mounted in end-to-end alinement on rigid brackets which are affixed to the conveyor machine framework; and all of said ultra-high molecular polyethylene bars for supporting both the product side and return side of the conveyor belt are of identical dimensions with respect to one another so as to be readily interchangable.

* * * * *